United States Patent
Lin

(10) Patent No.: US 8,654,072 B2
(45) Date of Patent: Feb. 18, 2014

(54) INTERACTIVE GAME METHOD AND SYSTEM WITH SPORTS INJURY PROTECTION

(75) Inventor: Cho-Yi Lin, HsinChu (TW)

(73) Assignee: Pixart Imaging Incorporation, Hsin-Chu (TW)

(*) Notice: Subject to any disclaimer, the term of this patent is extended or adjusted under 35 U.S.C. 154(b) by 923 days.

(21) Appl. No.: 12/070,882

(22) Filed: Feb. 21, 2008

(65) Prior Publication Data

US 2008/0273011 A1   Nov. 6, 2008

(30) Foreign Application Priority Data

May 3, 2007   (TW) ................................ 96115720 A

(51) Int. Cl.
*G09G 5/00*   (2006.01)
(52) U.S. Cl.
USPC ................ 345/156; 463/1; 473/569; 273/108
(58) Field of Classification Search
USPC ................................................. 345/156–184
See application file for complete search history.

(56) References Cited

U.S. PATENT DOCUMENTS

2006/0166737 A1*   7/2006   Bentley ........................ 463/30
2007/0265104 A1*   11/2007   Haga et al. .................... 473/37

FOREIGN PATENT DOCUMENTS

JP   09-274534   10/1997
JP   2005-349047   12/2005

* cited by examiner

*Primary Examiner* — Alexander Eisen
*Assistant Examiner* — Cory Almeida
(74) *Attorney, Agent, or Firm* — Tung & Associates

(57) ABSTRACT

The present invention discloses an interactive game method with sports injury protection, comprising: providing a remote pointing device for a user to swing; and triggering a safety mechanism in one or more of the following conditions: (1) when a user swings the remote pointing device drastically; (2) when a count of swings exceeds a first threshold; and (3) when a count of swings in a predetermined time period exceeds a second threshold.

16 Claims, 5 Drawing Sheets

INTERACTIVE GAME METHOD AND SYSTEM WITH SPORTS INJURY PROTECTION

FIELD OF THE INVENTION

The present invention relates to an interactive game method and an interactive game system with a function to protect a user from sports injury.

DESCRIPTION OF THE RELATED ART

Interactive game systems functioning in response to the 3-dimensional (3D) actions of a user have become very popular, such as the famous Wii game by Nintendo. In such games, a user holds a remote pointing device provided by the interactive game system, and interacts (e.g., to hit a ball or to swing) with the plot displayed on a screen. The interactive game system displays corresponding scenes in response to the movement and other actions of the remote pointing device. However, the virtue reality effect provided by such game systems often makes a user to swing the remote pointing device drastically, that is, to use the remote pointing device with a speed above a predetermined threshold speed, or in a rang larger than a predetermined threshold range, and makes the user to use the remote pointing device for too long, that is, longer than a predetermined threshold time period. This is dangerous because of the likelihood to cause sports injury.

In view of this risk, it is desired to provide a sports injury protection function in such interactive game systems. Note that, although the safety issue occurs more often in the 3D interactive game systems, the present invention can be applied to any system in which a remote controller or pointing device is used.

SUMMARY OF THE INVENTION

A first objective of the present invention to provide an interactive game method, wherein when a user swings a remote pointing device drastically or when a user uses the remote pointing device for too long, a safety mechanism is triggered to give an alarm or to initiate a corresponding countermeasure, so as to reminder the user the risk of sports injury.

A second objective of the present invention is to provide an interactive game system.

To achieve the foregoing objectives, and from one aspect of the present invention, an interactive game system with sports injury protection comprises: (1) a set-up box electrically connectable with a screen; and (2) a remote pointing device for communicating with the set-up box, the remote pointing device including: (2a) a first action sensor for sensing an acceleration of the remote pointing device; and (2b) a detection module for determining whether to trigger a safety mechanism according to the acceleration of the remote pointing device.

In another aspect of the present invention, an interactive game method with sports injury protection comprises: providing a remote pointing device for a user to swing; and triggering a safety mechanism in one or more of the following conditions: (1) when a user swings the remote pointing device drastically; (2) when a count of swings exceeds a first threshold; and (3) when a count of swings in a predetermined time period exceeds a second threshold.

In yet another aspect of the present invention, an interactive game method with sports injury protection comprises: providing a remote pointing device; detecting the acceleration of the remote pointing device; and triggering a safety mechanism when the acceleration is larger than a threshold.

In a further aspect of the present invention, an interactive game method with sports injury protection comprises: providing a remote pointing device; detecting the acceleration of the remote pointing device; incrementing a count when the acceleration is larger than a first acceleration threshold; and triggering a safety mechanism when the count is larger than a count threshold.

Preferably, the count is reset after a predetermined time period.

Also preferably, the safety mechanism includes one or more of the following: displaying a warning symbol on the screen; displaying a warning language on the screen; generating an audible sound of alarm; generating an audible sound of a comprehensive language; shutting down the screen; stopping the game; and inducing the user to slow down his action in an interactive way.

For better understanding the objects, characteristics, and effects of the present invention, the present invention will be described below in detail by illustrative embodiments with reference to the attached drawings.

DESCRIPTION OF THE PREFERRED EMBODIMENT

The present invention will be described in detail with reference to 3D interactive games. However, as explained above, the present invention can be applied to any system in which a remote controller or pointing device is used. Furthermore, there are multiple ways to implement the hardware of a 3D interactive game and to calculate 3D information; what are described below is to demonstrate that the present invention has reached a practicable stage, for enabling those skilled in this art, but should not be taken as limitations to the scope of the present invention.

Figure 1:
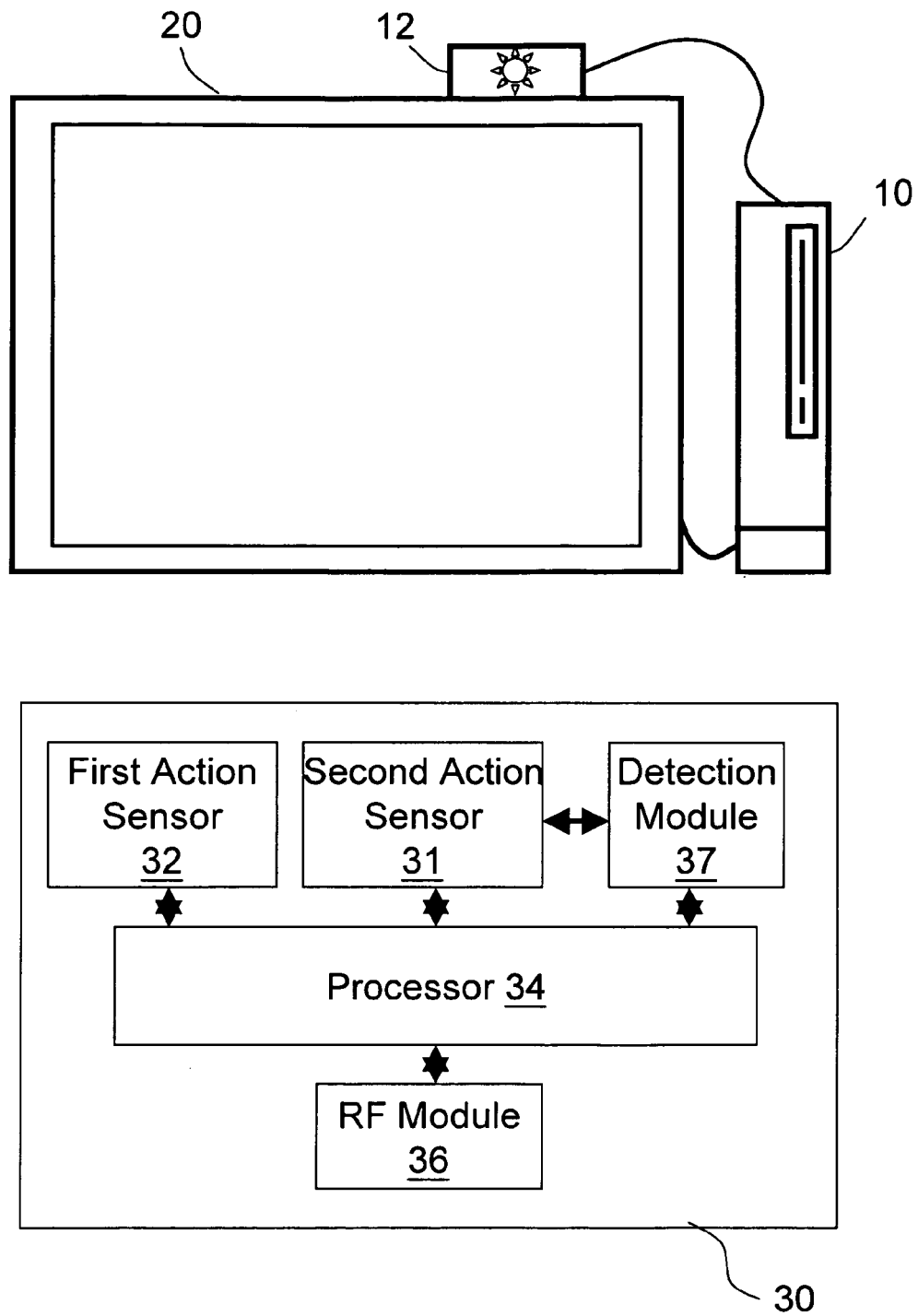
FIG. 1 shows an embodiment of an interactive game system according to the present invention.

Referring to FIG. 1, in one arrangement of a 3D interactive game, at least one light emission source 12 (preferably a 940 nm infrared light source) is provided; the light emission source 12 can communicate with a set-up box 10 in wired or wireless manner. A remote pointing device 30 is also provided, which includes two action sensors 31 and 32, wherein the first action sensor 31 for example can be an accelerometer or a gyro sensor, and the second action sensor 32 can be an optical sensor. The processor 34 of the interactive game system calculates the information provided by the optical sensor which senses the light from the light emission source 12, and the information provided by the first action sensor 31, to generate 3D stereo information. The stereo information is transmitted to the set-up box 10-through a wireless RF (radio frequency) module 36 for the interactive game, such as to display corresponding movements of a character, or to show an explosion, on a screen 20. Note that what is described above is only one among many possible ways to arrange the interactive game system. Other arrangements are of course possible. For example, the light emission source 12 can be positioned at any other location; the processor 34 can be positioned inside the set-up box 10; the communication between the remote pointing device 30 and the set-up box 10 can be done through wires; etc. For simplicity, not all of such possibilities are listed here, but they should all belong to the scope of the present invention.

The remote pointing device 30 further includes a detection module 37. The detection module 37 determines whether a user plays the game safely according to the acceleration or gravity information provided by the first action sensor 31. In one embodiment, the detection module 37 obtains the acceleration or gravity information directly from the first action sensor 31; in another embodiment, the detection module 37 obtains such information from the processor 34. The determination by the detection module 37 is sent to the processor 34, to trigger a corresponding action (i.e., the safety mechanism). The "corresponding action" or the "safety mechanism" for example can be: displaying a warning symbol on the screen; displaying a warning language on the screen; generating an audible sound of alarm; generating an audible sound of a comprehensive language; shutting down the screen; stopping the game; inducing the user to slow down his action in an interactive way; etc.

The criteria to determine whether a user plays the game safely can include one or more of the followings: (1) whether a user swings the remote pointing device 30 drastically; (2) whether a count of swings exceeds a first threshold; and (3) whether a count of swings in a predetermined time period exceeds a second threshold.

Figure 2A:
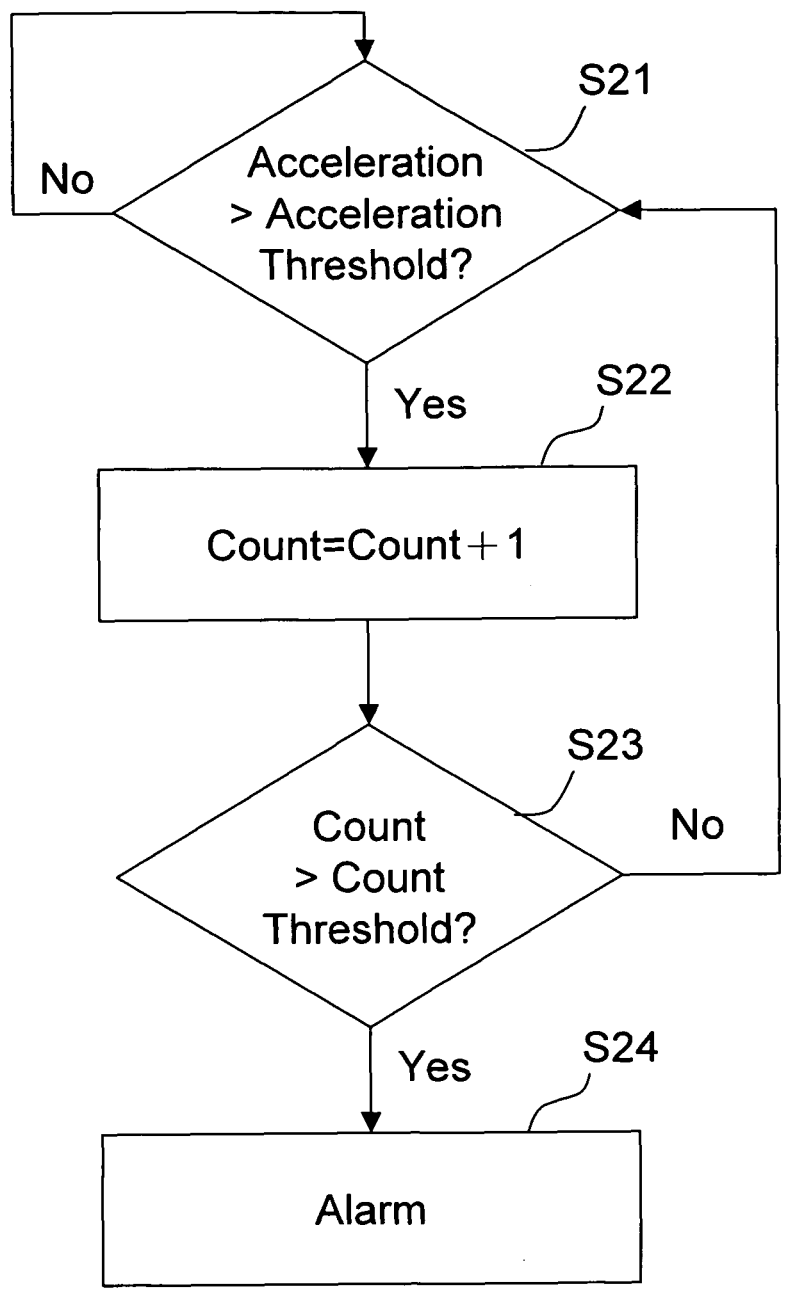
FIGS. 2A, 2B, 3 and 4 are flow charts showing embodiments to make safety judgment according to the present invention.

More specifically, FIG. 2A shows a flow chart to make safety judgment according to one embodiment of the present invention. First, at step S21, the detection module 37 determines whether the acceleration (or gravity variation, depending on whether an accelerometer or a gyro sensor is used) exceeds an acceleration threshold. If yes, in one embodiment (not shown), an alarm is immediately sent out. In the present embodiment, instead of immediately sending out the alarm, a count is incremented by 1 in step S22. The count represents an accumulated number of "drastic swings". When the count is larger than a count threshold (step S23), an alarm is sent out (step S24).

Figure 2B:
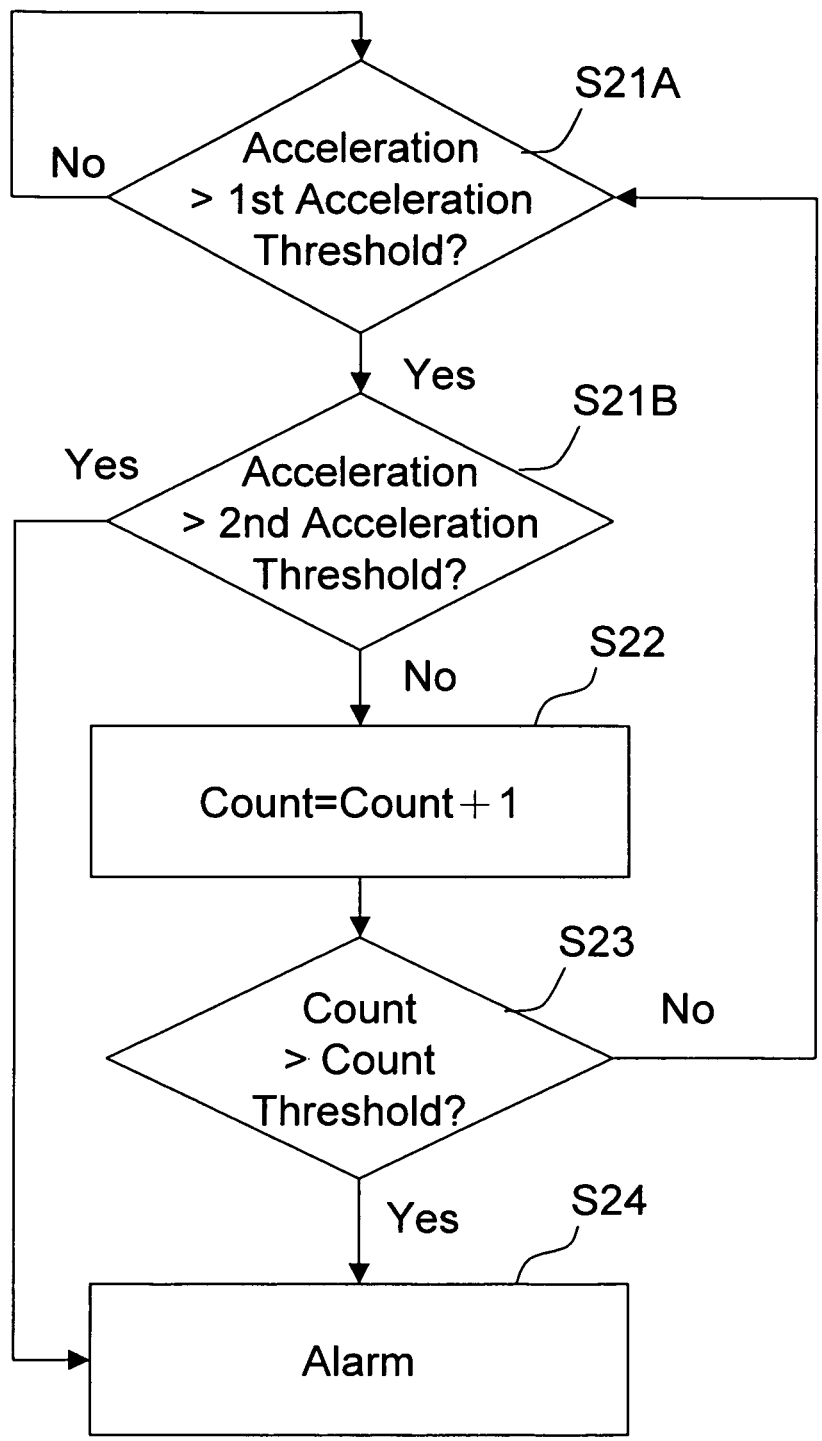

FIG. 2B shows a flow chart to make safety judgment according to another embodiment of the present invention, which combines two alarming mechanisms. First, at step S21A, it is determined whether the acceleration exceeds a first lower acceleration threshold. If yes, it is further determined whether the acceleration exceeds a second higher acceleration threshold (step S21B). If yes, an alarm is immediately sent out. If not, a count is incremented by 1 in step S22. When the count is larger than a count threshold (step S23), an alarm is sent out (step S24).

Figure 3:
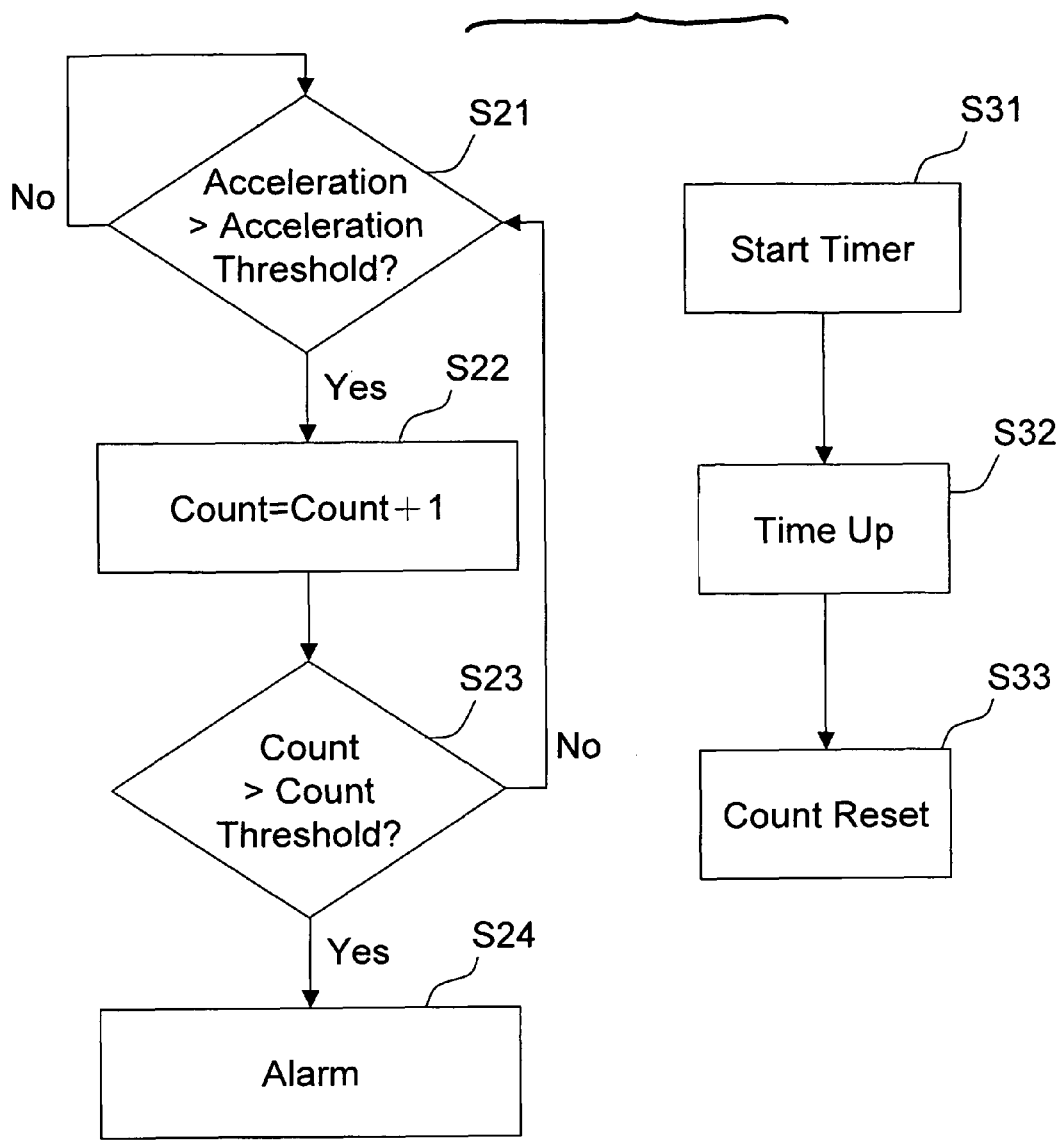

FIG. 3 shows a flow chart to make safety judgment according to a further other embodiment of the present invention. In this embodiment, in parallel to the process of the steps S21-S24, a process including steps S31 to S33 is carried out, which begins from the start timer step S31. If it reaches a predetermined length of time (step S32), the count is reset to zero (step S33). The count reset step S33 has a higher priority than the count increment step S22; if a reset and an increment instruction are concurrently generated in the circuit, the reset instruction is carried out, while the count increment step is ignored.

Figure 4:
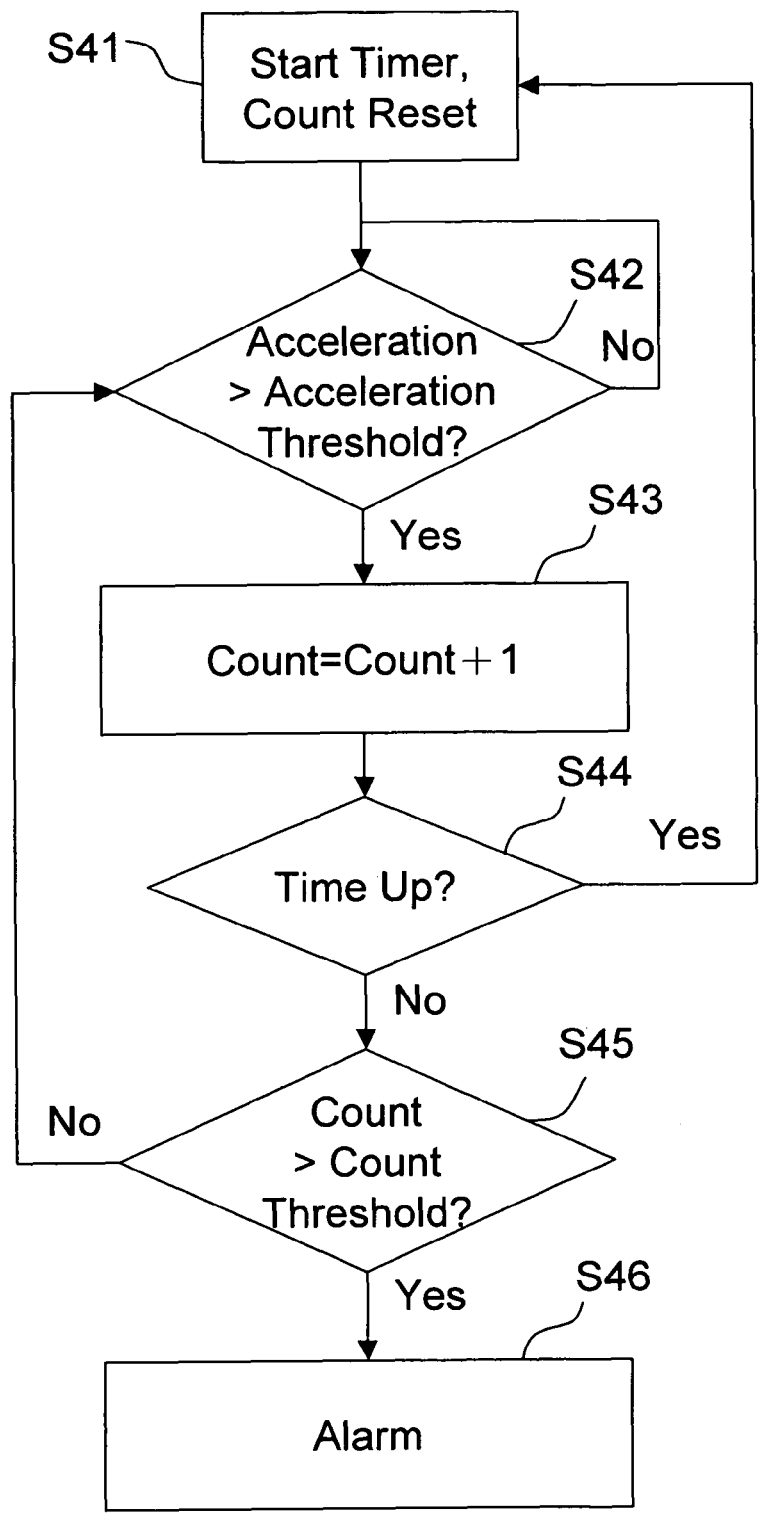

FIG. 4 shows a flow chart to make safety judgment in a serial manner, to achieve a comparable result as that of the embodiment of FIG. 3. In this embodiment, first start the timer and reset the count (step S41). Next, it is determined whether the acceleration exceeds an acceleration threshold (step S42). If yes, the count is incremented by 1 (step S43), and it is further checked whether the timer reaches or exceeds a predetermined length of time (step S44). If yes, the process goes back to step S41; otherwise it goes to step S45, to determine whether the count is larger than the count threshold. If yes, an alarm is sent out (step S46).

In all of the foregoing embodiments, if necessary, the acceleration thresholds, the count threshold, and/or the length of time, can be open to the user for customized set-up. Alternatively, a simplified option menu may be provided to the user to set the game to "mild use", "mid-wild use", "wild use", etc. Corresponding threshold numbers are determined according to the option selected by the user. In this way, for example, an adult can better manage younger users of the interactive game system.

The features, characteristics and effects of the present invention have been described with reference to its preferred embodiments, for illustrating the spirit of the invention and not for limiting the scope of the invention. Various other substitutions and modifications will occur to those skilled in the art, without departing from the spirit of the present invention. For example, one can insert a device between any two devices shown to be in direct connection in the figures, without affecting the primary function of the overall device. As another example, the interactive game system according to the present invention does not have to directly detect the acceleration of the remote pointing device by an accelerometer or a gyro sensor; the acceleration can be calculated by detecting the speed of the remote pointing device and obtaining the difference of the speeds between two time points. The communication between the remote pointing device and the set-up box can be done by any means other than in a wireless manner. Each device shown in the figures does not have to be a stand-alone hardware device; it can be integrated with any other device or function, or achieved in a software manner. For instance, the detection module 37 can be integrated with the processor 34 (embedded in the processor 34), or can be a software program executable by the processor 34, or can be integrated with the first action sensor 31. Thus, all such and other substitutions and modifications are intended to be embraced within the scope of the invention as defined in the appended claims.

What is claimed is:

1. An interactive game system with sports injury protection, comprising:
   a set-up box electrically connectable with a screen; and
   a remote pointing device for communicating with the set-up box, the remote pointing device including:
      a first action sensor for sensing an acceleration of the remote pointing device; and
      a detection module for counting and accumulating a number of times of swings when the acceleration is larger than a first acceleration threshold to obtain a count, wherein each time the acceleration is larger than the first acceleration threshold, the count is added by 1, and triggering a safety mechanism when the count is larger than a count threshold,
   wherein the safety mechanism includes one or more of the following: displaying a warning symbol on the screen; and
      displaying a warning language on the screen.

2. The interactive game system according to claim 1, wherein the first action sensor is an accelerometer or a gyro sensor.

3. The interactive game system according to claim 1, wherein the remote pointing device further includes a radio frequency transceiver for communicating with the set-up box.

4. The interactive game system according to claim 1, wherein the remote pointing device includes a processor for receiving information from the first action sensor and the detection module.

5. The interactive game system according to claim 4, wherein the detection module is a program executable by the processor.

6. The interactive game system according to claim 4, wherein the detection module is embedded in the processor.

7. The interactive game system according to claim 1, wherein the remote pointing device further includes a second action sensor for sensing optical signals.

8. An interactive game method with sports injury protection, comprising:
provid ing a remote pointing device for a user to swing;
counting and accumulating a number of swings to obtain a count, wherein the count is added by 1 for each swing; and
triggering a safety mechanism in one or more of the following conditions: (1) when the count exceeds a first threshold; and (2) when the count in a predetermined time period exceeds a second threshold.

9. An interactive game method with sports injury protection, comprising:
providing a remote pointing device;
detecting the acceleration of the remote pointing device;
counting and accumulating a number of times of swings when the acceleration is larger than a first acceleration threshold to obtain a count, wherein each time the acceleration is larger than the first acceleration threshold, the count is added by 1; and
triggering a safety mechanism when the count is larger than a count threshold.

10. The interactive game method according to claim 9, further comprising: triggering a safety mechanism when the acceleration of the remote pointing device is larger than a second acceleration threshold which is higher than the first acceleration threshold.

11. The interactive game method according to claim 9, further comprising: resetting the count after a predetermined time period.

12. The interactive game method according to claim 9, further comprising: displaying graphics on a screen according to the location of the remote pointing device, and wherein the safety mechanism includes one or more of the following: displaying a warning symbol on the screen; displaying a warning language on the screen; generating an audible sound of alarm; generating an audible sound of a comprehensive language; shutting down the screen; stopping the game; and inducing the user to slow down his action in an interactive way.

13. An interactive game system with sports injury protection, comprising:
a set-up box electrically connectable with a screen; and
a remote pointing device for communicating with the set-up box, the remote pointing device including:
a first action sensor for sensing an acceleration of the remote pointing device; and
a detection module for counting and accumulating a number of times of swings when the acceleration is larger than a first acceleration threshold to obtain a count, wherein each time the acceleration is larger than the first acceleration threshold, the count is added by 1, and triggering a safety mechanism when the count is larger than a count threshold,
wherein the safety mechanism includes: inducing the user to slow down his action in an interactive way.

14. An interactive game system with sports injury protection, comprising:
a set-up box electrically connectable with a screen; and
a remote pointing device for communicating with the set-up box, the remote pointing device including:
a first action sensor for sensing an acceleration of the remote pointing device; and
a detection module for counting and accumulating a number of times of swings when the acceleration is larger than a first acceleration threshold to obtain a count, wherein each time the acceleration is larger than the first acceleration threshold, the count is added by 1, and triggering a safety mechanism when the count is larger than a count threshold,
wherein the safety mechanism includes one or more of the following: generating an audible sound of a comprehensive language; shutting down the screen; and stopping the game.

15. An interactive game method with sports injury protection, comprising:
providing a remote pointing device;
detecting the acceleration of the remote pointing device;
counting and accumulating a number of times of swings when the acceleration is larger than a first acceleration threshold to obtain a count, wherein each time the acceleration is larger than the first acceleration threshold, the count is added by 1; and
triggering a safety mechanism when the count is larger than a count threshold,
wherein the safety mechanism includes: inducing the user to slow down his action in an interactive way.

16. An interactive game method with sports injury protection, comprising:
providing a remote pointing device;
detecting the acceleration of the remote pointing device;
counting and accumulating a number of times of swings when the acceleration is larger than a first acceleration threshold to obtain a count, wherein each time the acceleration is larger than the first acceleration threshold, the count is added by 1; and
triggering a safety mechanism when the count is larger than a count threshold,
wherein the safety mechanism includes one or more of the following: generating an audible sound of a comprehensive language; shutting down the screen; and stopping the game.

* * * * *